March 18, 1941.  E. R. BARRETT  2,235,136

DUMP BODY CONSTRUCTION

Filed Jan. 26, 1940

INVENTOR
Edward R. Barrett.
BY Harness, Dickey & Pierce.
ATTORNEYS.

Patented Mar. 18, 1941

2,235,136

UNITED STATES PATENT OFFICE 2,235,136

DUMP BODY CONSTRUCTION

Edward R. Barrett, Detroit, Mich., assignor to Gar Wood Industries, Inc., Detroit, Mich., a corporation of Michigan Application January 26, 1940, Serial No. 315,646

3 Claims. (Cl. 298—17)

The present invention relates to dump truck constructions having a body mounted for tilting movement with respect to the truck chassis.

One of the primary objects of the present invention is the provision of an improved construction of the type mentioned in which the body is self-aligning as it is lowered from its dumping position to its horizontal position with respect to the chassis, thereby permitting quick getaways by the truck after the load is dumped.

Another object of the invention is the provision of an improved construction of the type mentioned in which the body is self-aligning as it is being dropped to its lowered position while the truck is in position.

Another object of the invention is to provide a dump truck construction of low mount, or one in which the body is relatively close to the ground, in which the body is so constructed that it straddles the hoist sub-frame on the chassis, thereby providing ample strength so that the vehicle will stand up under the rigorous conditions to which it is subjected.

Another object of the invention is to provide an improved construction of the type mentioned in which the body longitudinals and the hoist sub-frame both can be of almost any required depth to give strength without such depth affecting the mounting height.

Another object of the invention is to provide an improved relationship between the body and vehicle construction, thereby permiting a simplified hinge structure.

Other objects of the invention will become apparent from the following specification, the drawing relating thereto, and from the claims hereinafter set forth.

In the drawing, in which like numerals are used to designate like parts in the several views throughout:

Figure 1:
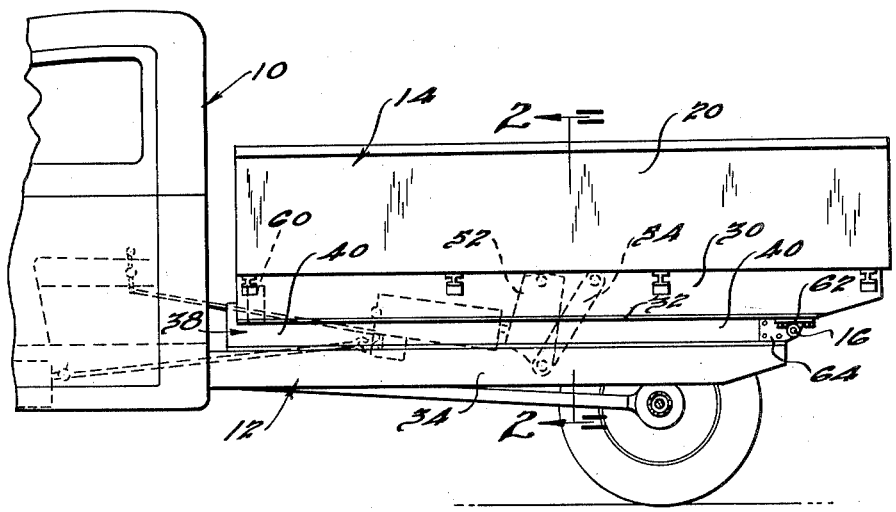
Figure 1 is a partial, side elevational view of a dump truck construction according to the present invention.
Figure 2:
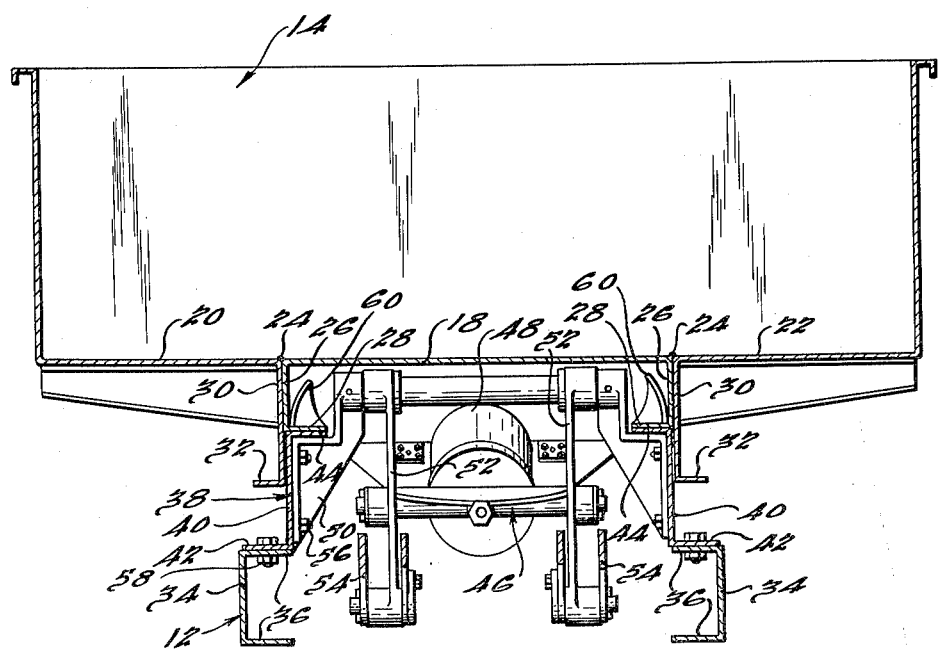
Fig. 2 is an enlarged cross-sectional view taken substantially along the line 2—2 of Fig. 1.

In the use of dump trucks of the type to which the present invention is directed, it is the practice of drivers to start driving their trucks away as soon as the load is dumped. At this time the body is in its raised position and while the truck is moving is dropped or lowered to its horizontal position. This travel of the truck is usually over rough ground and at relatively high speeds so that the body sways from side to side due to the jerking action of the truck. According to the present invention, a construction is provided by which the body is self-aligning as it is lowered, thereby permitting this dropping of the body during movement of the truck without danger of injury to the body.

Also, present day demands require relatively low body mounts which requirement introduces difficult construction problems. Heretofore, in low mounts, it has not been possible to get enough strength in the longitudinal beams, nor in the hoist sub-frame when one is set above the other. According to the present invention, the elements are so constructed and arranged that the longitudinal beams on the sub-frame are mounted in straddling relationship, so that ample strength is obtained. Also, the relationship between the body, the sub-frame, and the chassis, must be such that adequate hoisting mechanism may be mounted thereon in order to obtain the desired lift. The construction of the present invention permits this provision of adequate hoisting mechanism.

Referring to the drawing, a dump truck is generally indicated at 10 having a chassis generally indicated at 12 and a body generally indicated at 14 pivotally mounted with respect to the chassis about transversely aligned pivot pins 16 located adjacent the rear end of the chassis.

The body 14 is formed of three main sections, namely, a longitudinally extending central section 18 and oppositely disposed side sections 20 and 22. Such sections are formed of sheet metal and are welded together as indicated at 24. The central section 18 has depending side portions 26 extending longitudinally thereof which terminate in inwardly turned flanges 28. Each of the side sections 20 and 22 has depending portions 30 along the inner edges thereof which terminate in outwardly disposed flanges 32. The side portions 30 are of greater depth than the side portions 26 so that they depend a substantial distance below flanges 28; for a purpose which will be pointed out in greater detail hereinafter.

The chassis 12 includes longitudinally extending side members 34 which are of channel section, thereby providing top and bottom inwardly disposed flanges 36.

A hoist sub-frame, generally indicated at 38, is mounted on the chassis 12 and is fixed thereto. Such sub-frame 38 includes longitudinally extending sill members 40 of Z cross-section, thereby providing outwardly disposed bottom flanges 42 and inwardly disposed top flanges 44. The frame 38 is substantially co-extensive with the rear carrying portion of the chassis 12 and also includes transversely extending bracing members (not shown), so that a rugged and rigid frame is provided.

A hoisting mechanism generally indicated at 46 is provided which is connected to the sub-frame 38 and is connected to the body so that upon actuation of the hoisting mechanism, the body is tilted with respect to the chassis and with respect to the sub-frame 38 about pivots 16. The hoisting mechanism 46 may be of conventional construction but preferably is of the construction disclosed and claimed in the copending application of Edward R. Barrett, Serial No. 308,303, filed December 8, 1939. Such hoisting mechanism includes a cylinder 48 connected to the sub-frame 38 by means of brackets 50, connected to the sub-frame through linkage means 52, which in turn is connected to the body through linkage means 54. The piston within the cylinder 48 is hydraulically actuated by means of a pump connected to the power take-off of the engine through a flexible drive shaft with an operating lever located in the cab, in the usual way.

The brackets 50 are connected to the longitudinal members 40 by means of bolts 56 having countersunk heads so that the outer surfaces of members 40 are substantially smooth.

The sub-frame 38 having the hoisting mechanism mounted thereon may be mounted on the chassis 12 as a unit. The flanges 42 seat upon flanges 36 of the longitudinal chassis members 34 and are suitably fixed thereto such as by bolts 58.

When the body is in its lowered position, it is supported upon flanges 44 of members 40 in that flanges 28 rest thereon. It will thus be seen that portions 30 of sides 20 and 22 extend below flanges 28 so that the depending portions bear against the outer surfaces of members 40. The body 14 thus straddles the sub-frame 38.

The side portions 30 extend their full length along the members 40 so that the depending portions of such sides 30 bear against the members 40 from the pivot point to the front of the body. Therefore, it will be evident that as the body is lowered, the depending portions of sides 30 always engage the members 40 in overlapping or straddling relationship so that the body is self-aligning while it is being lowered.

In order to assist in guiding the body to its proper seat, particularly when using long bodies, cam members 60 having upwardly and inwardly disposed cam surfaces, are mounted to the flanges 44 of members 40 adjacent the front ends thereof. Portions of flanges 28 are cut away adjacent the front ends thereof so that the members 60 may project upwardly therethrough. It will thus be seen that the cam surfaces of members 60 will abut against the inner faces of portions 26 in the event that the front end of the body has swayed a little out of line during the final positioning of the body with respect to the chassis.

The overlap of portions 30, or the straddling of the sub-frame 38 by the body, not only assists in the aligning of the body as it is lowered, but also provides a rugged and strong construction when the body is in its normal position with respect to the chassis.

A low mount may be used and a simple body hinge. The body is provided with depending hinge members 62; and hinge members 64 are connected to the rear ends of members 40 of the sub-frame. The pivot pins 16 pass through aligned openings in the hinge parts 62 and 64, thereby providing a simplified hinge construction.

Formal changes may be made in the specific embodiment of the invention described without departing from the spirit and substance of the invention, the scope of which is commensurate with the appended claims.

What is claimed is:

1. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, and the depending portions of said side members extending below the flanges on the depending portions of said central member.

2. A vehicle body comprising a central member and oppositely disposed side members secured to said central member, the outer edges of said central member having integral depending portions extending therealong terminating along the bottom edges in inwardly disposed flanges, the inner edges of said side members having integral depending portions extending therealong with the bottom edges thereof terminating in outwardly disposed flanges, the depending portions of said side members extending below the flanges on the depending portions of said central member, and the facing surfaces of the depending portions of the side members bearing against the adjacent faces, respectively, of the depending portions of the central member.

3. A dump truck construction comprising, in combination, a chassis, a sub-frame mounted on said chassis and fixed thereto, said sub-frame having longitudinally extending transversely spaced members, said members having upstanding sides terminating in inwardly disposed flanges along the upper edges thereof, a body pivotally mounted with respect to the chassis, said body comprising a central section and oppositely disposed side sections secured to said central section, the outer edges of said central section having integral depending portions terminating in inwardly disposed flanges, the inner edges of said side sections having integral depending portions terminating in outwardly disposed flanges, the depending portions of said side sections extending below the flanges on the depending portions of said central section, the construction and arrangement being such that the flanges on said central section seat upon the flanges on said longitudinally extending members when the body is in its lowered position, and the portions of the depending portions of the side sections which extend below the flanges on the depending portions of the central section bear against the outer faces of the upstanding sides of the longitudinally extending members.

EDWARD R. BARRETT.